(12) United States Patent
Wolf

(10) Patent No.: US 6,458,181 B1
(45) Date of Patent: Oct. 1, 2002

(54) METHOD FOR PRODUCING PIG IRON

(76) Inventor: Bodo Wolf, Bahnhofstrasse 4a, D-09638 Lichtenberg (DE)

( * ) Notice: Subject to any disclaimer, the term of this patent is extended or adjusted under 35 U.S.C. 154(b) by 0 days.

(21) Appl. No.: 09/581,700

(22) PCT Filed: Dec. 10, 1998

(86) PCT No.: PCT/EP98/08067

§ 371 (c)(1),
(2), (4) Date: Jun. 16, 2000

(87) PCT Pub. No.: WO99/35294

PCT Pub. Date: Jul. 15, 1999

(30) Foreign Application Priority Data

Jan. 8, 1998 (DE) ......................... 198 00 418

(51) Int. Cl.⁷ ................................. C21B 5/06
(52) U.S. Cl. ......................................... 75/463
(58) Field of Search ........................... 75/463

(56) References Cited

U.S. PATENT DOCUMENTS

| | | | | |
|---|---|---|---|---|
| 3,909,446 A | * | 9/1975 | Miyashita et al. | ............ 75/463 |
| 4,425,159 A | * | 1/1984 | Nixon | ............ 75/463 |

FOREIGN PATENT DOCUMENTS

| | | |
|---|---|---|
| DE | 19 39 354 | 2/1971 |
| DE | 23 12 600 | 10/1973 |
| DE | 24 13 558 | 10/1974 |
| DE | 24 31 537 | 1/1976 |
| DE | 132 672 | 10/1978 |
| EP | 0 657 550 | 6/1995 |
| GB | 858 561 | 1/1996 |

OTHER PUBLICATIONS

H.–W. Gudenau et al., "Versuche Zum Kombinierten Einblasen Von Kohlenstaub und Feinkoernigen Eisenerzen in Den Hochofen," Stahl und Eisen, vol. 117, No. 6, Jun. 16, 1997, pp. 61–68, 103.

Patent Abstracts of Japan, vol. 007, No. 147 (C–173), Jun. 28, 1983 & JP 58 058206 A (Sumitomo Kinzoku Kogyo KK), Apr. 6, 1983 No month.

H.–W. Gudenau et al., Verwertung Durch Einschmelzen Sekundärmetallgewinnung und Energienutzung bei der thermischen Behandlung von Abfällen, Düsseldorf, Sep. 22 and 23, 1997, pp. 1–12.

H. Ost and B. Rassow, Lehrbuch Der Chemischen Technologie [Textbook of chemical technology], 26$^{th}$ edition, Leipzig, Barth–Verlag, 1995, pp. 1039–1076 No month.

* cited by examiner

*Primary Examiner*—Melvyn Andrews
(74) *Attorney, Agent, or Firm*—Foley & Lardner

(57) ABSTRACT

Disclosed is a method for producing pig iron using blast furnaces or other appropriate devices, in which materials containing iron are reduced and smelted in the presence of fuels. According to the invention, metallurgical coke can be converted into reduction gas and coke using economical organic exchange gases by combining a multistep process for exchange fuel gasification and a blast furnace process, into which the products of the gasification are fed together or separately at a height of the mouth of the tuyere or through the latter into a melt. The gasification process is also used in the prereduction or iron oxides, fine ores and ore concentrates.

8 Claims, 1 Drawing Sheet ular heat supply. However, such an allotropic process possesses the disadvantage that the reaction temperature is limited to about 800 to maximum 950° C. Thus, only a reduction gas can be obtained which has a relatively high proportion of $CO_2$ and $H_2O$ and thus possesses a small reduction potential with regard to iron

METHOD FOR PRODUCING PIG IRON

BACKGROUND OF THE INVENTION

1. Field of the Invention

The invention concerns a process for the production of pig iron with the help of fossil and secondary fuels, especially of hard and brown coal or of other organic fuels, such as refuse and sewage sludge, from iron ore or oxides which are made available in natural, pelleted form or in the form of ore dust or concentrate.

The invention can be used in the production of pig iron in blast furnaces or other installations which are suitable for a multi-stage carrying out of the process, such as e.g. the reduction of the ore to iron and the melting of the iron.

2. Description of Related Art

The carrying out of the process in the production of pig iron with the help of blast furnaces has, for many decades, remained substantially unchanged although a plurality of measures have become known for increasing the output by increase of the furnace dimensions and increasing of the process pressure and for the reduction of the coke consumption, e.g. by blowing in of other fuels, such as coal, heating oil, natural gas, coke oven gas, refuse, sewage sludge, ore, as well as the use of oxygen and the like. Results are given inter alia by Gudenau in the periodical "Stahl und Eisen" 117 (1997), No. 6 under the title "Experiments for the combined blowing in of coal dust and fine-grained iron-ore into the blast furnace" and at the 1st TIMS/IEHK Metallurgical Symposium Sep. 28/29, 1997, in Cairo under the title "Environmental and economical benefits by injecting iron containing recyclings and steel plant residues into the blast furnace" and the VDI with the handbook "Utilisation by smelting, secondary metal recovery and energy utilisation in the case of the thermal treatment of wastes" at the seminar on the 22nd and Sep. $23^{rd}$, 1997, in Düsseldorf.

A fundamental description of the blast furnace processes is given, inter alia, in the textbook of Ost, H: Rassow, B: "Textbook of chemical technology", 26th edition, Leipzig, Barth-Verlag, 1955.

Characteristic for the state of the art of the carrying out of the process in the blast furnace is the gasification of coke and of other organic fuels in countercurrent for the reduction of the iron ore so that the process heat requirement and the particular oxidation stage of the ore determine the gas composition and therewith the maximum possible fuel utilisation in the blast furnace which, referred to the oxidation potential of the fuel in practical operation, reaches approximately 75%. Therefore, indispensable component of the blast furnace process is the regenerative pre-heating of the process air which, outside of the blast furnace, uses a part of the chemical enthalpy of the blast furnace gas and thus returns into the process. Good blast furnace plant thus reach a fuel utilisation of about 83% in the case of the use of a high portion of expensive, scarce metallurgical coke as fuel.

In DE-OS 19 39 354 is described a coupling of a blast furnace or fan shaft furnace with an external reduction gas production, whereby blast furnace gas from the furnace is reacted with a gaseous, liquid or solid hydrocarbon preferably containing 1 to 13 carbon atoms in a tubular heater and/or heat exchanger with indirect heat supply. However, such an allotropic process possesses the disadvantage that the reaction temperature is limited to about 800 to maximum 950° C. Thus, only a reduction gas can be obtained which has a relatively high proportion of $CO_2$ and $H_2O$ and thus possesses a small reduction potential with regard to iron oxide. As a result, the furnace must be loaded with a large amount of gas which leads to a sacrifice of capacity. Furthermore, the $CO_2$ contained in the reduction gas and the water vapour are reduced on the glowing coke in the blast furnace which also contributes to a reduction of the capacity of the furnace.

The relatively low reaction temperatures of up to maximum 950° C. in the case of this allotropic reduction gas production process lies, however, below the melt temperatures of inorganic components such as are normally contained in qualitatively low value fuels, such as hard and brown coals, refuse or sewage sludge. It follows from this that this process is only suitable for very pure and thus expensive fuels.

In DE-AS 24 13 558, the external production of a reduction gas takes place with the help of a plasma burner, whereby the reaction enthalpy necessary for the gasification of the fuel must be supplied by electro-energy. Thus, this process is very expensive and can only be carried out when cheap electro-energy is available. In the process, recycled blastfurnace gas which contains CO, $CO_2$, $H_2$ and $H_2O$ and possibly carbon and/or hydrocarbon are ionised in an electric arc and brought into contact in a mixing chamber with a further part stream of blast furnace gas and carbon and/or hydrocarbon so that an endothermic post-reaction takes place. However, the process is also only suitable for very pure starting products, such as hydrocarbons or high-grade coal dust, since a slag removal is not possible not only from the combustion chamber but also from the mixing or reaction chamber of the reduction gas production.

Especially having regard to an ecologically-caused energy cost increase, for example by the introduction of an energy tax, the economy of this process is decreased and calls for other technical solutions for the reduction gas production, like the present invention.

From GB-PS 858 561, it is known to react solid fuels with air and/or oxygen to give a reduction gas, whereby the hot combustion products must be blown in at a temperature of about 1100 to 1600° C. over a separate pipe system into a blast or fan shaft furnace. The technical carrying out of this process is very complicated and expensive. Furthermore, such process procedures in which the gases must be supplied at these high temperatures to the auxiliary nozzles have not proved themselves in practice. The high gas temperatures would require the construction of an external coal gasification directly on the blast furnace which, as is known, is practically not realisable because of the constructional actualities of the blast furnace plant.

SUMMARY OF THE INVENTION

The technical task and the object of the invention are, therefore, to suggest new possibilities for the better utilisation of the fuels, as well as for the further substitution of metallurgical coke by other qualitatively lower grade fuels, preferably by brown or hard coal, but also refuse and sewage sludge, as well as coke dust obtained in the case of reduction gas production, and for the increase of capacity of the blast furnace.

The task is solved by analysis of the decisive courses of the process of the iron ore reduction and iron smelting with the help of the thermodynamic system iron-carbon-hydrogen-oxygen.

DETAILED DESCRIPTION OF PREFERRED EMBODIMENTS

Figure 1:
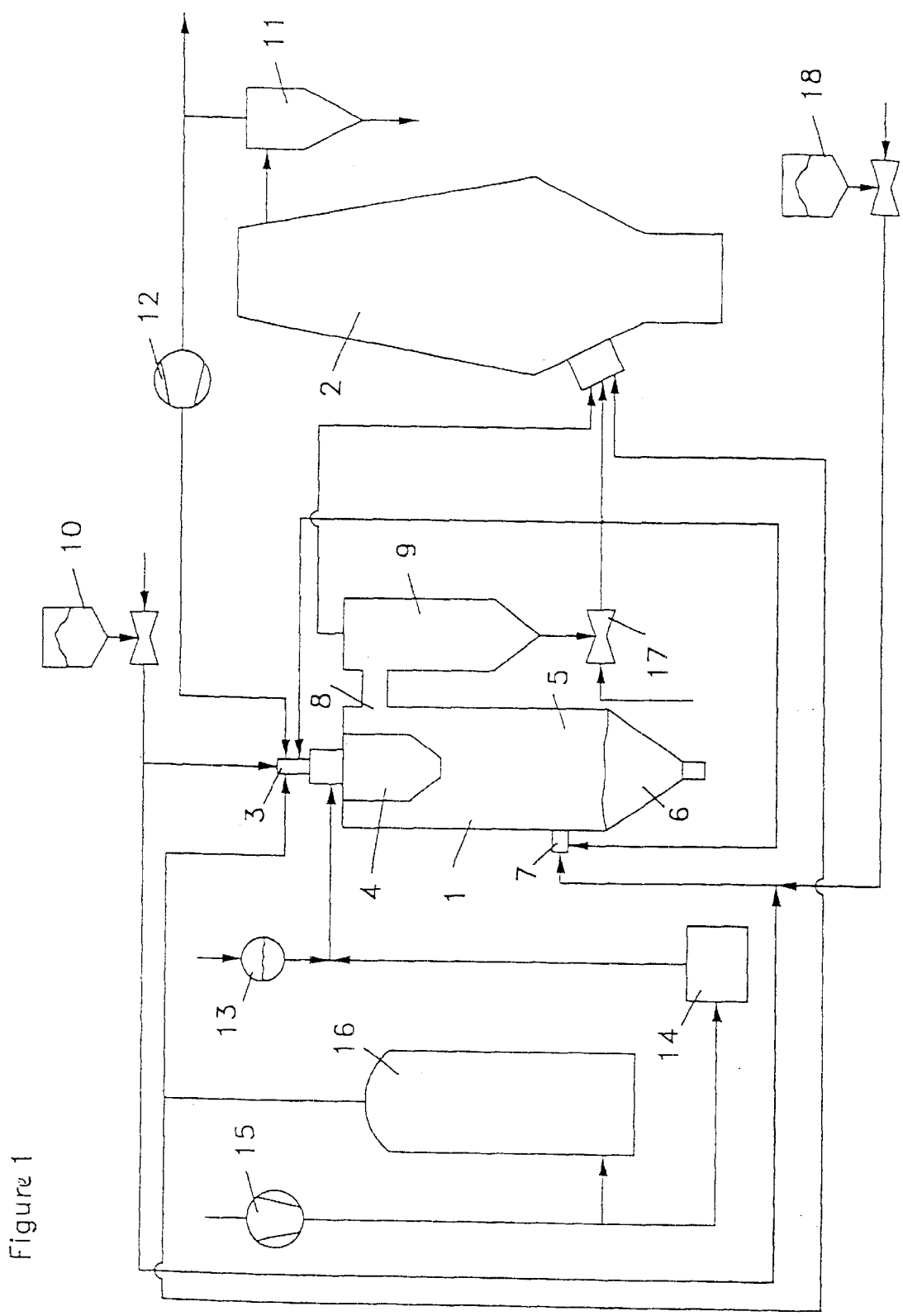
FIG. 1 depicts a process for the production of pig-iron according to the invention.

According to the invention, it is suggested to couple the blast furnace process with an external, multi-step process for the gasification of preferably powdered fossil and secondary as well as other organic fuels and/or coke obtained in the gasification process itself in which, in a first process step, the fuels are exothermally gasified with air and/or oxygen with addition of blast furnace gas from the blast furnace and/or water vapour under a pressure which is higher than the pressure in the blast furnace at the height of the blast tuyere and at a temperature between 900 and 1800° C. to give reduction gas, the quality of which corresponds approximately to that of the equilibrium gas on the phase boundary iron/wuestite in the thermo-dynamic system iron-carbon-hydrogen-oxygen and in which, by blowing in of further fuels in a second process step, which there partly react chemically endothermally with the hot reduction gas, the quality of the reduction gas is so improved that the mole ratio of the reducing gas components carbon monoxide and hydrogen to those of the oxidising components carbon dioxide and water vapour amount to at least 3:1 before it emerges from the gasification process and is blown into the blast furnace at the height of or via the tuyeres with a temperature of 300 to 1000° C.

The gasification of the fuels in the first process step preferably takes place above the melt temperature of inorganic components, whereby the impurities are then removed in the form of slag from the second process step.

The pulverised fuel not reacted in the second process step, present as coke dust in the reduction gas, is, according to the invention, blown with the reduction gas into the blast furnace or, with the help of an arrangement according to the prior art, arranged between gasification process and blast furnace, separated off from the reduction gas.

Advantageously, via the directed blowing in of coke dust from the second process step into the blast furnace, there takes place a regulation of the temperature gradients in the reduction zone of the furnace and thus the heat balance of the blast furnace controlled.

Modern processes should ensure an almost residue-free utilisation of the fuel. This is ensured in that preferably in the case of operational states which permit no additional blowing in of coke dust, according to the invention at such operational states the coke dust obtained can preferably again be returned to the gasification process, whereby, in this case, the supply of fresh fuel to the gasification process can advantageously be reduced or stopped in favour of the recycling of the coke dust obtained. The coke dust can thereby be recycled not only into the first but also into the second gasification step.

As a rule, the coke dust obtained is less active than the external fuel. Therefore, in the case of recycling into the second process step, for the ensuring of a greatest possible conversion, the less active coke dust is preferably first supplied to the hot gasification agent from the first process step into its direction of flow in order to utilise the higher temperature level for the activation of the less reactive coke dust. Only thereafter is the fresh fuel supplied to the gasification agent, already cooled by the blowing in of the coke dust, the lower temperature level of which suffices, however, for a substantially gasification of fresh fuel.

The coke dust can advantageously also be removed from the process and used somewhere else.

Furthermore, according to the invention, it is suggested to add iron ores or iron oxides in the form of fine ore or concentrate to the powdery fuels or to the coke dust before blowing into the second process step of the gasification process and, in the second process step of the gasification, to reduce these at least partly, to blow the mixture obtained of coke dust/ pre-reduced iron ore/iron sponge with the reduction gas into the blast furnace or to separate this from the reduction gas leaving the second process step of the gasification and, for the avoidance of abrasiveness, to blow with the help of dense flow conveying systems, independently of the reduction gas, into the blast furnace or another known device, e.g. a smelting furnace, and there to melt.

The economic advantage of the invention results from the relief of the investment-expensive blast furnace plant and coking plant by external production of reduction gas and coke dust by gasification of fuels, which are considerably cheaper in comparison with metallurgical coke, with the help of gasification plant, the investment cost of which is more favourable and from an increase of the pig iron production of the blast furnace of up to 30% thereby possible.

EMBODIMENTAL EXAMPLE

In the following, the invention is to be described for two cases of use.

Case of Use 1

The description of the case of use 1, in which a two-stage gasification process 1 is coupled with a blast furnace 2, takes place with the help of FIG. 1.

In the first process step 4 of the gasification process 1, via the burner 3, hard coal pulverised fuel, which is introduced via the dense flow conveying system 10, is, as external fuel and as gasification agent, freed from dust in the purification plant 11 and in the compressor 12 is blown into the compression-increased blast furnace gas and oxygen from the air separation plant 14 which draws the air via the pressurised air system of the blast furnace plant 15, as well as water vapour from the steam system 13 and possibly hot air from the air heater 16 and there converted into reduction gas at a temperature of 1500° C. and a pressure of 7 bar by chemical-exothermic reaction. The ash of the fuels is thereby melted and flows from the first process step 4 through the second process step 5 into the waterbath 6, where it solidifies non-elutably.

The air removal from the pressurised air system 15 of the blast furnace plant reduces the requirements of the regenerative hot wind production in the air heater 16. With the help of the given possibilities for the mixing of the gasification agents air, oxygen, blast furnace gas and water vapour, the volume flow in the gasification process 1 and thus, in turn, the heat transport in the blast furnace process 2 can be controlled.

The reduction gas from the first process step 4 of the gasification process 1 is blown into the second process step 5 with a velocity of about 20 m/s and there also loaded with hard coal fuel dust introduced via the dense flow conveying system 10 and lances 7. The fuel dust reacts chemically endothermally in the second process step 5 with the 1500° C. hot reduction gas, whereby the temperature of the reduction gas sinks in the second process step 5 to 700° C. Residual coke is thereby obtained which is removed with the gas via the gas outlet 8 from the gasification process 1 in a cyclone 9. In the cyclone 9, the residual coke is substantially separated off from the reduction gas. The following Table shows the comparison of the gas compositions of the reaction gas after the first and the second process steps 4 and 5 of the gasification process 1.

|  | reduction gas composition after | |
| --- | --- | --- |
| gas components | 1st process step vol. % | 2nd process step vol. % |
| CO | 46.41 | 50.29 |
| $CO_2$ | 14.97 | 7.31 |
| $H_2$ | 7.09 | 21.24 |
| $H_2O$ | 9.14 | 3.63 |
| $CH_4$ | 0.00 | 0.01 |
| $N_2$ | 22.22 | 17.34 |
| $H_2S$ | 0.13 | 0.15 |
| COS | 0.04 | 0.03 |
| sum | 100.00 | 100.00 |

Referred to the total coal fuel dust blown into the first and second process steps, 1.1 m³ of reduction gas are produced at normal temperature and pressure and 390 g residual coke per kg of hard coal fuel dust. The reduction gas and the residual coke are removed separately from the cyclone 9 and, for the avoidance of abrasion, blown separately via the or at the height of the tuyeres into the blast furnace.

Case of Use 2

In the case of the case of use 2, the gasification process 1 is operated as described in case of use 1 and illustrated in FIG. 1. To the burner 3 of the first process step 4 and to the lances 7 of the second process step 5 of the gasification process 1 are also supplied only external fuels via the dense flow conveying system 10, whereby to the fuels, which are supplied via the lances 7 of the second process step 5, are admixed fine ore and/or ore concentrate with the help of the dosing means 18.

The reduction gas obtained in the cyclone 9 is, as in the case of case of use 1, passed via the tuyeres into the blast furnace process 1 and/or, after increasing of pressure, as gasification agent passed via the burner 3 of the first process step 4 of the gasification process 1 or used somewhere else, whereas the mixture of residual coke, iron sponge and pre-reduced ore also obtained in the cyclone 9 is blown via the tuyeres or at the height of the tuyeres into the blast furnace process 1 with the help of the dense flow conveying system 17.

What is claimed is:

1. A process for production of pig iron comprising the steps of:
   (a) chemically-exothermally gasifying a first fuel comprising a fossil fuel with
      (i) air; and/or
      (ii) oxygen with the addition of blast furnace gas from a blast furnace process; and/or
      (iii) water vapor under a pressure higher than a pressure in a blast furnace at a height of a tuyere and at a temperature between 1000 and 1800° C.;
   to produce a first reduction gas and coke dust;
   (b) blowing a second fuel comprising a fossil fuel into said reduction gas wherein said fuel partially reacts with said first reduction gas to produce a second reduction gas and coke dust and wherein a mole ratio of reducing components, carbon monoxide and hydrogen, to oxidizing components, carbon dioxide and water vapor, is at least 3:1;
   (c) blowing said second reduction gas into a blast furnace at a height of a tuyere at a temperature of 300 to 1000° C.

2. A process for the production of pig iron according to claim 1, further comprising regulating a temperature gradient in reduction zones of said blast furnace by introducing into said blast furnace coke dust resulting from step (b) in addition to said first reduction gas resulting from step (a).

3. A process for production of pig iron according to claim 1, further comprising:
   (d) separating coke dust from the first reduction gas of step (a); and
   (e) recycling coke dust from step (d).

4. A process for production of pig iron according to claim 3, wherein step (e) further comprises introducing said recycled coke dust into said blast furnace along with said second fuel and said first reduction gas during step (b) to maximize conversion by supplying said recycled coke dust to the hot gasification agent of step (a) in its direction of flow for thermal activation and, only thereafter, supplying said first fuel to a cooled gasification agent by introduction of said coke dust.

5. A process for the production of pig iron according to claim 1, further comprising
   (f) admixing iron oxide dusts, fine ore and/or ore concentrate with said second fuel before the introduction of said second fuel in step (b).

6. A process for the production of pig iron according to claim 5, wherein said iron oxide dusts, said fine ore and/or said ore concentrate are partially reduced to iron sponge in step (b).

7. A process for the production of pig iron according to claim 5, further comprising:
   (g) passing a solid mixture, comprising residual coke, iron sponge and pre-reduced ore, with said second reduction gas into a dust separator; and
   (h) separating said solid mixture from said second reduction gas and/or blowing said solid mixture into said blast furnace or a melting trough while gasiflying the residual coke with air and/or oxygen and further reducing the fine ore to iron sponge.

8. A process for the production of pig iron according to claim 1, wherein said first fuel or said second fuel further comprises refuse or sewage sludge.

* * * * *